United States Patent
Srivastava et al.

(10) Patent No.: US 12,105,583 B2
(45) Date of Patent: Oct. 1, 2024

(54) FAULT RECOVERY SYSTEM FOR FUNCTIONAL CIRCUITS

(71) Applicant: NXP B.V., Eindhoven (NL)

(72) Inventors: Neha Srivastava, New Delhi (IN); Hemant Nautiyal, Greater Noida (IN); Andres Barrilado Gonzalez, Toulouse (FR)

(73) Assignee: NXP B.V., Eindhoven (NL)

( * ) Notice: Subject to any disclaimer, the term of this patent is extended or adjusted under 35 U.S.C. 154(b) by 63 days.

(21) Appl. No.: 17/813,737

(22) Filed: Jul. 20, 2022

(65) Prior Publication Data

US 2023/0027878 A1    Jan. 26, 2023

(30) Foreign Application Priority Data

Jul. 23, 2021 (EP) ..................................... 21306033

(51) Int. Cl.
*G06F 11/07* (2006.01)
*G06F 11/00* (2006.01)

(52) U.S. Cl.
CPC ........ *G06F 11/0793* (2013.01); *G06F 11/008* (2013.01); *G06F 11/0706* (2013.01); *G06F 11/0724* (2013.01); *G06F 11/0757* (2013.01)

(58) Field of Classification Search
CPC ............... G06F 11/0793; G06F 11/008; G06F 11/0706; G06F 11/0724; G06F 11/0757
See application file for complete search history.

(56) References Cited

U.S. PATENT DOCUMENTS

| | | | |
|---|---|---|---|
| 5,864,656 A * | 1/1999 | Park | G06F 11/0757 714/10 |
| 6,374,196 B1 | 4/2002 | Hashimoto et al. | |
| 6,857,094 B2 | 2/2005 | Shigeta | |
| 7,778,252 B2 | 8/2010 | Watkins | |
| 7,802,150 B2 | 9/2010 | Meyer-Grafe et al. | |

(Continued)

OTHER PUBLICATIONS

Mukherjee et al., "A Systematic Methodology to Compute the Architectural Vulnerability Factors for a High-Performance Microprocessor," Proceedings. 36th Annual IEEE/ACM International Symposium on Microarchitecture, 2003. MICRO-36. Dec. 5, 2003, 12 pages.

(Continued)

*Primary Examiner* — Bryce P Bonzo
*Assistant Examiner* — Michael Xu

(57) ABSTRACT

A fault recovery system includes various fault management circuits that form a hierarchical structure. One fault management circuit detects a fault in a functional circuit and executes a recovery operation to recover the functional circuit from the fault. When the fault management circuit fails to recover the functional circuit from the fault within a predetermined time duration, a fault management circuit that is in a higher hierarchical level executes another recovery operation to recover the functional circuit from the fault. Such a fault management circuit is required to execute the corresponding recovery operation within another predetermined time duration to successfully recover the functional circuit from the fault. The fault recovery system thus implements the hierarchical structure of fault management circuits to recover the functional circuit from the fault.

19 Claims, 5 Drawing Sheets

(56) References Cited

U.S. PATENT DOCUMENTS

| | | |
|---|---|---|
| 8,484,514 B2 | 7/2013 | Tonouchi |
| 8,566,139 B2 | 10/2013 | Fedosovskiy et al. |
| 10,990,714 B2 | 4/2021 | Martin et al. |
| 2002/0112207 A1 | 8/2002 | Shigeta |
| 2002/0116670 A1* | 8/2002 | Oshima ............... G06F 11/0712 714/E11.003 |
| 2003/0196141 A1* | 10/2003 | Shaw .................. G06F 11/0724 714/48 |
| 2004/0225831 A1* | 11/2004 | Pail ....................... G06F 11/073 711/105 |
| 2009/0037770 A1* | 2/2009 | Troppmann ........ G06F 11/0757 714/24 |
| 2015/0088476 A1 | 3/2015 | Guo et al. |
| 2015/0235338 A1* | 8/2015 | Alla .................... G06F 11/0721 345/522 |
| 2017/0177424 A1 | 6/2017 | Guay |
| 2017/0177756 A1 | 6/2017 | Martin et al. |
| 2020/0409783 A1* | 12/2020 | Müller ................ G06F 11/0709 |
| 2021/0365323 A1* | 11/2021 | Yu ........................ G06F 11/1417 |
| 2022/0129349 A1* | 4/2022 | Chaiken ............. G06F 11/1417 |

OTHER PUBLICATIONS

Sridharan et al., "Quantifying Software Vulnerability," WREFT'08, May 5, 2008, Ischia, Italy, 6 pages.

Fang et al., "ePVF: An Enhanced Program Vulnerability Factor Methodology for Cross-layer Resilience Analysis," 2016 46th Annual IEEE/IFIP International Conference on Dependable Systems and Networks (DSN), 12 pages.

* cited by examiner

FAULT RECOVERY SYSTEM FOR FUNCTIONAL CIRCUITS

BACKGROUND

The present disclosure relates generally to electronic circuits, and, more particularly, to a fault recovery system for functional circuits.

Fault recovery systems include various fault management circuits that manage fault recoveries of various functional circuits (such as processors, memories, or the like). Such fault recovery systems can be included on system-on-chips (SoCs), printed circuit boards (PCBs), or the like. Typically, when a fault is detected in a functional circuit, the fault recovery system is required to recover the functional circuit from the fault within a predetermined time duration to prevent the occurrence of a hazardous event. The hazardous event may correspond to the failure of various components of an associated SoC or an associated PCB. This predetermined time duration can be referred to as a fault handling time interval (FHTI).

The predetermined time duration is typically defined for the fault recovery system in entirety. In other words, as long as the functional circuit is recovered from the fault within the predetermined time duration, the SoC or the PCB continues to operate in a desired manner. However, in such a fault recovery system, the entire FHTI is typically consumed to recover all types of faults, even the faults that can be recovered in a significantly lesser time duration than the FHTI. As a result, there is a significant degradation in a performance (i.e., a throughput) of the fault recovery system. Therefore, there exists a need for a technical solution that solves the aforementioned problems of existing fault recovery systems.

SUMMARY

In an embodiment of the present disclosure, a fault recovery system is disclosed. The fault recovery system can include a first fault management circuit that can be coupled with a first functional circuit. The first fault management circuit can be configured to detect a first fault in the first functional circuit and execute a first recovery operation to recover the first functional circuit from the first fault. The fault recovery system can further include a second fault management circuit that can be coupled with the first fault management circuit. The second fault management circuit can be configured to execute, based on a failure of the first fault management circuit to execute the first recovery operation within a first predetermined time duration, a second recovery operation to recover the first functional circuit from the first fault.

In another embodiment of the present disclosure, electronic circuitry is disclosed. The electronic circuitry can include a first functional circuit and a fault recovery system that can be coupled with the first functional circuit. The fault recovery system can include first and second fault management circuits. The first fault management circuit can be coupled with the first functional circuit. The first fault management circuit can be configured to detect a first fault in the first functional circuit and execute a first recovery operation to recover the first functional circuit from the first fault. The second fault management circuit can be coupled with the first fault management circuit. The second fault management circuit can be configured to execute a second recovery operation to recover the first functional circuit from the first fault. The second fault management circuit can execute the second recovery operation based on a failure of the first fault management circuit to execute the first recovery operation within a first predetermined time duration.

In some embodiments, the second fault management circuit can execute the second recovery operation based on a fault detection signal and a first trigger signal. The fault detection signal can be indicative of the detection of the first fault, and the first trigger signal can be indicative of the failure of the first fault management circuit to execute the first recovery operation within the first predetermined time duration. Alternatively, the second fault management circuit can execute the second recovery operation based on a first timestamp value that can be equal to the first predetermined time duration.

In some embodiments, the first fault management circuit can include a first timer and a first processing circuit that can be coupled with the first timer. The first timer can be configured to generate a first timer count. The first processing circuit can be configured to detect the first fault in the first functional circuit and generate and provide a first control signal to the first timer to activate the first timer. While the first timer is activated, the first processing circuit can be further configured to execute the first recovery operation.

In some embodiments, when the first timer count is equal to a first threshold value, the first timer can be further configured to generate a first time-out signal. Equality of the first timer count and the first threshold value can be indicative of the failure of the first fault management circuit to execute the first recovery operation within the first predetermined time duration. The first processing circuit can be further configured to receive the first time-out signal from the first timer, and generate and provide a second control signal to the first timer to deactivate the first timer.

In some embodiments, the first processing circuit can be further coupled with the second fault management circuit. The first processing circuit can be further configured to generate and provide, when the first fault is detected, the fault detection signal to the second fault management circuit. The first processing circuit can be further configured to generate and provide, when the first time-out signal is received, the first trigger signal to the second fault management circuit.

In some embodiments, the first processing circuit can be further coupled with the second fault management circuit. The first processing circuit can be further configured to generate and provide, when the first time-out signal is received, the first timestamp value to the second fault management circuit.

In some embodiments, the first functional circuit can be successfully recovered from the first fault when the second fault management circuit executes the second recovery operation within a second predetermined time duration. The recovery of the first functional circuit from the first fault can be unsuccessful when the execution of the second recovery operation exceeds the second predetermined time duration.

In some embodiments, the second fault management circuit can include a second timer and a second processing circuit that can be coupled with the second timer. The second timer can be configured to generate a second timer count. The second processing circuit can be configured to generate and provide a third control signal to the second timer to activate the second timer. The second processing circuit can be further configured to execute the second recovery operation. When the second processing circuit executes the second recovery operation within the second predetermined time duration, the second processing circuit can be further configured to generate and provide a fourth control signal to the second timer to deactivate the second timer.

In some embodiments, when the execution of the second recovery operation exceeds the second predetermined time duration, the second fault management circuit can be further configured to generate one of a second trigger signal and a second timestamp value. The second trigger signal can be indicative of the failure of the second fault management circuit to execute the second recovery operation within the second predetermined time duration. Further, the second timestamp value can be equal to a sum of the first and second predetermined time durations.

In some embodiments, the second fault management circuit can include a second timer and a second processing circuit that can be coupled with the second timer and the first fault management circuit. The second timer can be configured to generate a second timer count. The second processing circuit can be configured to receive, from the first fault management circuit, the fault detection signal and the first trigger signal. Alternatively, the second processing circuit can be configured to receive the first timestamp value from the first fault management circuit.

In some embodiments, when the fault detection signal is received, the second processing circuit can be further configured to generate and provide a third control signal to the second timer to activate the second timer. When the first trigger signal is received, the second processing circuit can be further configured to execute the second recovery operation.

In some embodiments, when the second timer count is equal to a second threshold value, the second timer can be further configured to generate a second time-out signal. Equality of the second timer count and the second threshold value can be indicative of the failure of the second fault management circuit to execute the second recovery operation within the second predetermined time duration. The second processing circuit can be further configured to receive the second time-out signal from the second timer, and generate and provide a fourth control signal to the second timer to deactivate the second timer. The second processing circuit can be further configured to generate the second trigger signal when the second time-out signal is received.

In some embodiments, the second processing circuit can be further configured to generate and provide a third control signal to the second timer to activate the second timer when the first timestamp value is received. While the second timer is activated, the second processing circuit can be further configured to execute the second recovery operation.

In some embodiments, when the second timer count is equal to a second threshold value, the second timer can be further configured to generate a second time-out signal. Equality of the second timer count and the second threshold value can be indicative of the failure of the second fault management circuit to execute the second recovery operation within the second predetermined time duration. The second processing circuit can be further configured to receive the second time-out signal from the second timer, and generate and provide a fourth control signal to the second timer to deactivate the second timer. The second processing circuit can be further configured to generate the second timestamp value when the second time-out signal is received.

In some embodiments, the fault recovery system can further include a third fault management circuit that can be coupled with the first and second fault management circuits. The third fault management circuit can be configured to execute a third recovery operation to recover the first functional circuit from the first fault. The third fault management circuit can execute the third recovery operation based on the fault detection signal and the second trigger signal. Alternatively, the third fault management circuit can execute the third recovery operation based on the second timestamp value. The first functional circuit can be successfully recovered from the first fault when the third fault management circuit executes the third recovery operation within a third predetermined time duration.

In some embodiments, the fault recovery system can further include a controller that can be coupled with the first through third fault management circuits. The controller can be configured to record an operational state associated with the fault recovery system and a set of rules associated with the first fault. The controller can be further configured to receive, from the first through third fault management circuits, first through third reporting data when the first through third fault management circuits execute the first through third recovery operations, respectively. The first through third reporting data can be indicative of the first through third predetermined time durations, respectively. The controller can be further configured to estimate a sequence of recovery operations to be executed by the first through third fault management circuits for the first fault. The controller can estimate the sequence of recovery operations based on the operational state, the set of rules, the first through third predetermined time durations, and availability of the first through third fault management circuits during the first through third recovery operations, respectively.

In some embodiments, the fault recovery system can further include a controller that can be coupled with the first and second fault management circuits. The controller can be configured to record an operational state associated with the fault recovery system and a set of rules associated with the first fault. The controller can be further configured to receive, from the first and second fault management circuits, first and second reporting data when the first and second fault management circuits execute the first and second recovery operations, respectively. The first reporting data and the second reporting data can be indicative of the first and second predetermined time durations, respectively. The controller can be further configured to estimate a sequence of recovery operations to be executed by the first and second fault management circuits for the first fault. The controller can estimate the sequence of recovery operations based on the operational state, the set of rules, the first and second predetermined time durations, and availability of the first and second fault management circuits during the first and second recovery operations, respectively.

In some embodiments, the controller can be further configured to update the set of rules based on the estimated sequence of recovery operations.

In some embodiments, the fault recovery system can further include a fourth fault management circuit that can be coupled with a second functional circuit and the second fault management circuit. The fourth fault management circuit can be configured to detect a second fault in the second functional circuit and execute a fourth recovery operation to recover the second functional circuit from the second fault. The second fault management circuit can be further configured to execute a fifth recovery operation to recover the second functional circuit from the second fault based on a failure of the fourth fault management circuit to recover the second functional circuit from the second fault within a fourth predetermined time duration. The first and second functional circuits can be successfully recovered from the first and second faults when the second fault management circuit executes the second and fifth recovery operations, respectively, within a fifth predetermined time duration. Further, the recoveries of the first and second functional circuits from the first and second faults, respectively, are unsuccessful when the execution of the second and fifth recovery operations exceeds the fifth predetermined time duration.

Various embodiments of the present disclosure disclose a fault recovery system. The fault recovery system can include a fault management circuit that can be coupled with a functional circuit. The fault management circuit can detect a fault in the functional circuit and execute a recovery operation to recover the functional circuit from the fault. When the fault management circuit fails to recover the functional circuit from the fault within a predetermined time duration, another fault management circuit of the fault recovery system can execute another recovery operation to recover the functional circuit from the fault. The fault recovery system of the present disclosure can thus recover the functional circuit from the fault by way of a hierarchical structure of fault management circuits. In such a scenario, a fault management circuit executes a recovery operation (i.e., attempts recovery of the functional circuit from the fault) exclusively when a fault management circuit of a lower hierarchical level fails to complete the recovery. The hierarchical fault recovery ensures that fault recovery for each fault does not consume the entire fault handling time interval (FHTI) associated with the fault recovery system of the present disclosure.

The fault recovery system can further include a controller that can estimate a sequence of recovery operations to be executed by various fault management circuits for the fault when the fault is detected again. The sequence of recovery operations can be estimated based on previously executed recovery operations and information associated therewith (i.e., time budgets and availability of the fault management circuits). The operations of the controller further optimize the hierarchical fault recovery, thereby further reducing a time duration required for the fault recovery. The reduction in the time duration required for the fault recovery results in an increase in the availability of the fault management circuits of the fault recovery system. As a result, a performance (i.e., a throughput) of the fault recovery system of the present disclosure is significantly greater than that of a conventional fault recovery system where fault recovery for each fault consumes an entire FHTI.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
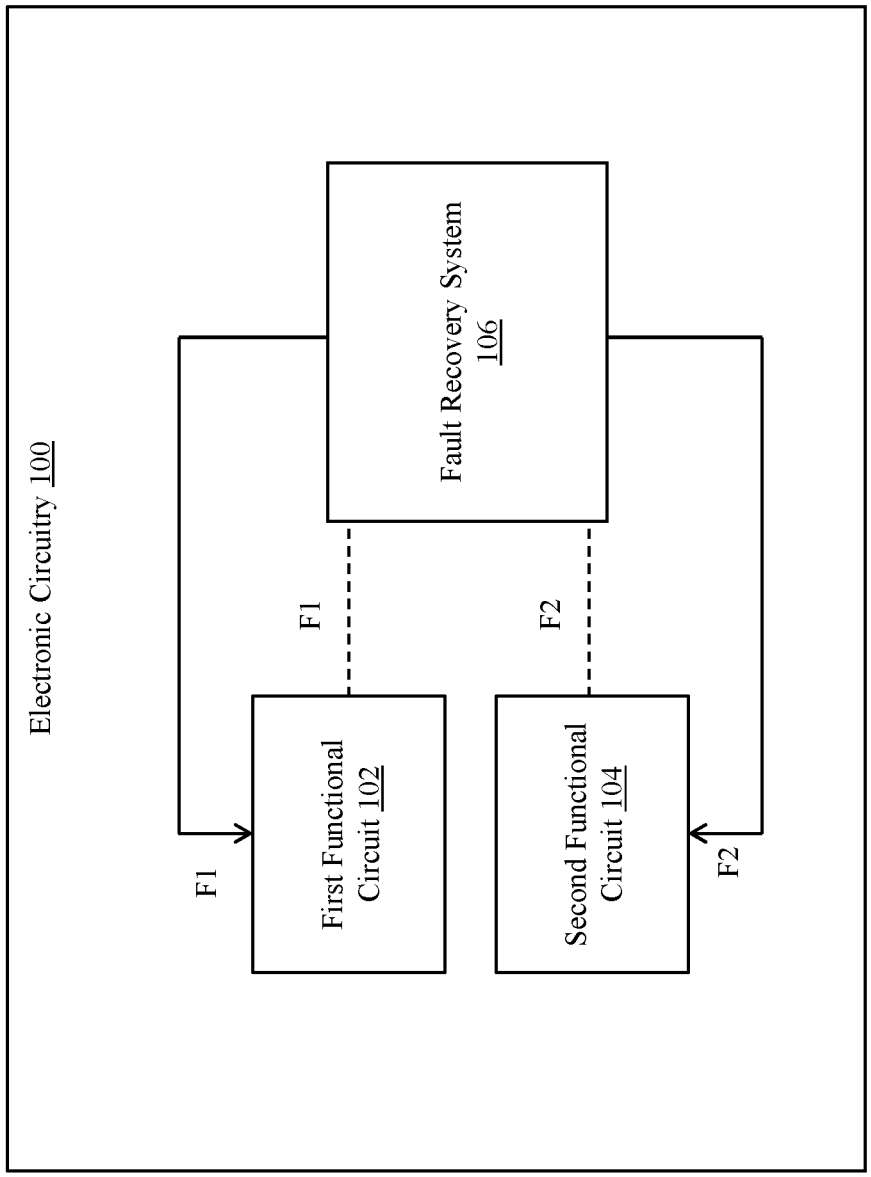
FIG. 1 illustrates a schematic block diagram of electronic circuitry in accordance with an embodiment of the present disclosure.

FIG. 1 illustrates a schematic block diagram of electronic circuitry 100 in accordance with an embodiment of the present disclosure. The electronic circuitry 100 can include first and second functional circuits 102 and 104 and a fault recovery system 106. Examples of the electronic circuitry 100 can include a printed circuit board (PCB), a system-on-chip (SoC), or the like.

The first and second functional circuits 102 and 104 can have various faults therein. For example, the first and second functional circuits 102 and 104 can have first and second faults F1 and F2 therein, respectively. The first and second faults F1 and F2 can be externally injected into the first and second functional circuits 102 and 104, respectively. In an embodiment, the first and second faults F1 and F2 can be injected into the first and second functional circuits 102 and 104, respectively, by the fault recovery system 106. Examples of the first and second functional circuits 102 and 104 can include processors, memories, or the like.

Although FIG. 1 describes that the first and second functional circuits 102 and 104 have the first and second faults F1 and F2 therein, respectively, that are externally injected, it will be apparent to a person skilled in the art that the scope of the present disclosure is not limited to it. In various other embodiments, the first and second functional circuits 102 and 104 can have third and fourth faults (not shown) therein that can be a result of a failure of various components of the first and second functional circuits 102 and 104, respectively, without deviating from the scope of the present disclosure. In such a scenario, the recoveries of the first and second functional circuits 102 and 104 from the third and fourth faults can be similar to that from the first and second faults F1 and F2, respectively.

The fault recovery system 106 can be coupled with the first and second functional circuits 102 and 104, respectively. The fault recovery system 106 can be configured to inject the first and second faults F1 and F2 in the first and second functional circuits 102 and 104, respectively. For example, the fault recovery system 106 can include one or more controllers (shown later in FIGS. 2A-2D) that can be configured to inject the first and second faults F1 and F2 in the first and second functional circuits 102 and 104, respectively. Further, the fault recovery system 106 can be configured to detect the first and second faults F1 and F2 in the first and second functional circuits 102 and 104, respectively. For example, the fault recovery system 106 can include one or more fault management circuits (shown later in FIGS. 2A-2D) that can be configured to detect the first and second faults F1 and F2 in the first and second functional circuits 102 and 104, respectively. Based on the detection of the first and second faults F1 and F2, the fault recovery system 106 can be further configured to execute various recovery operations to recover the first and second functional circuits 102 and 104 from the first and second faults F1 and F2, respectively. The fault recovery system 106 is explained in detail in conjunction with FIGS. 2A-2D.

The structure and functionalities of the fault recovery system 106 can vary based on the type of the electronic circuitry 100. For example, the structure and functionalities of the fault recovery system 106 when the electronic circuitry 100 corresponds to a PCB can be different than that when the electronic circuitry 100 corresponds to an SoC. The fault recovery system 106 associated with a PCB is illustrated in FIGS. 2A and 2B, and the fault recovery system 106 associated with an SoC is illustrated in FIGS. 2C and 2D.

It will be apparent to a person skilled in the art that the electronic circuitry 100 is shown to include two functional circuits to make the illustrations concise and clear and should not be considered as a limitation of the present disclosure. In various other embodiments, the electronic circuitry 100 can include more than two functional circuits, without deviating from the scope of the present disclosure. In such a scenario, the fault recovery associated with each additional functional circuit can be executed in a similar manner as described above.

Figure 2A:
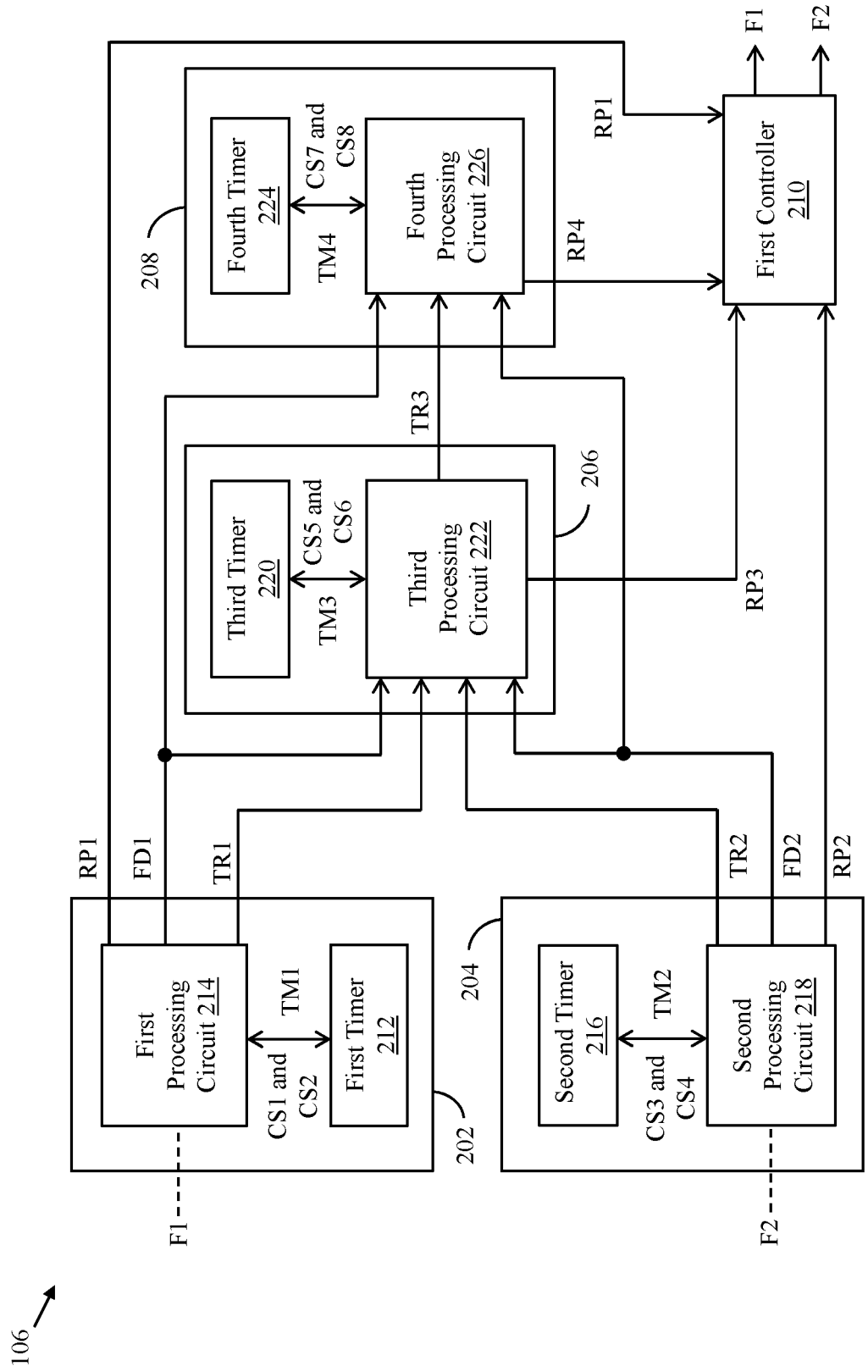
FIG. 2A illustrates a schematic block diagram of a fault recovery system of the electronic circuitry of FIG. 1 in accordance with an embodiment of the present disclosure.
Figure 2B:
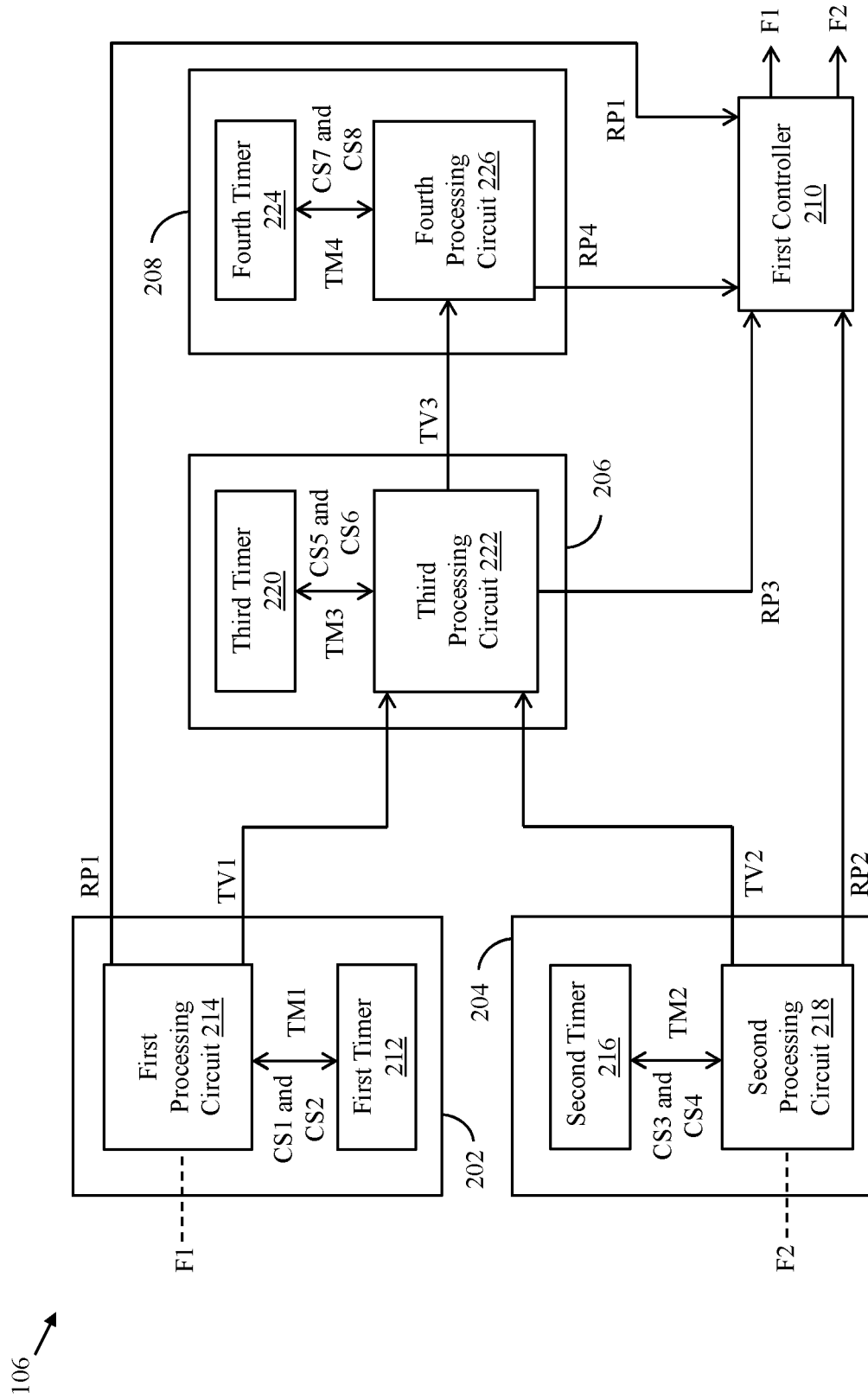
FIG. 2B illustrates a schematic block diagram of the fault recovery system of the electronic circuitry of FIG. 1 in accordance with another embodiment of the present disclosure.
Figure 2C:
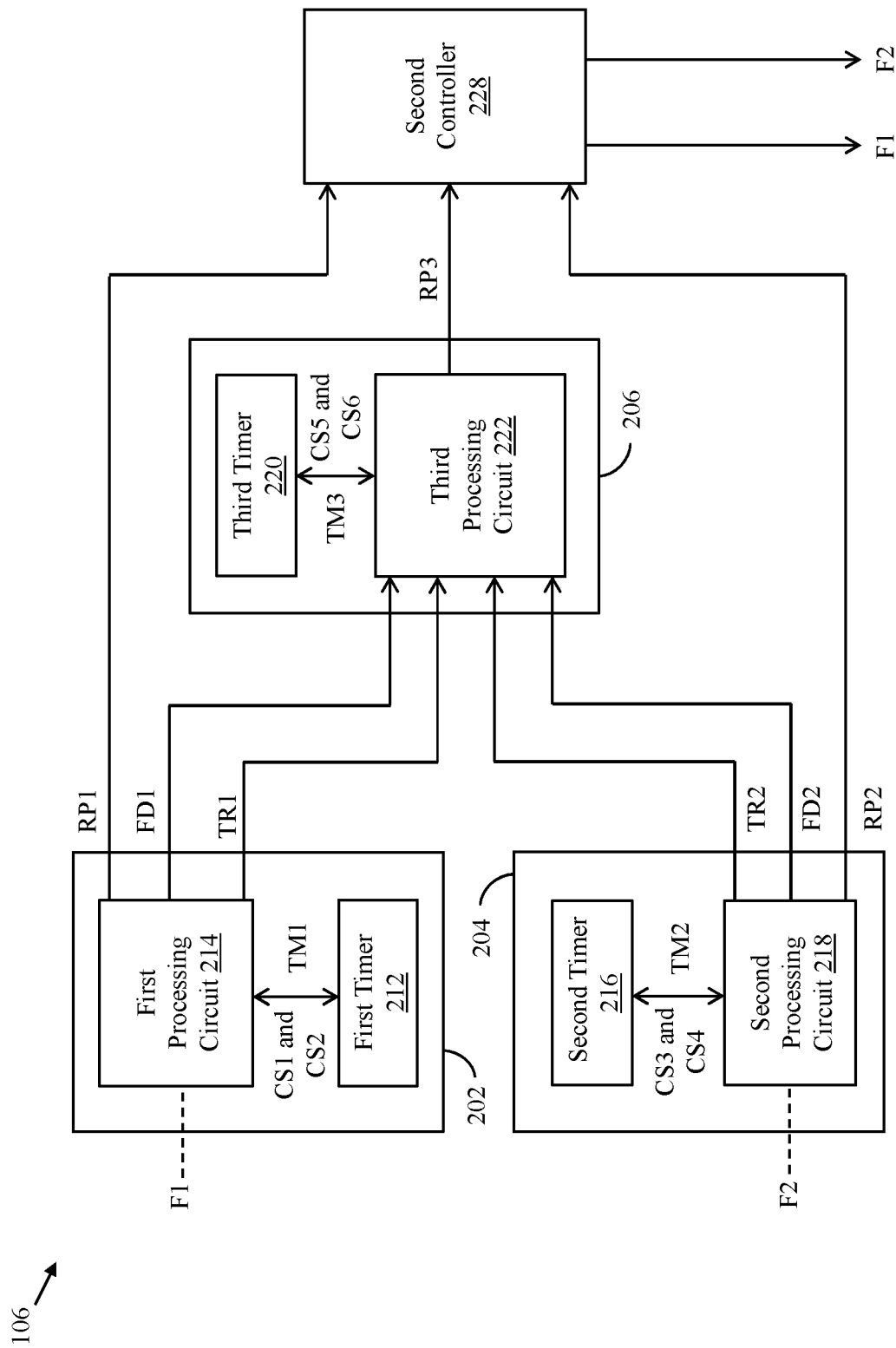
FIG. 2C illustrates a schematic block diagram of the fault recovery system of the electronic circuitry of FIG. 1 in accordance with yet another embodiment of the present disclosure.
Figure 2D:
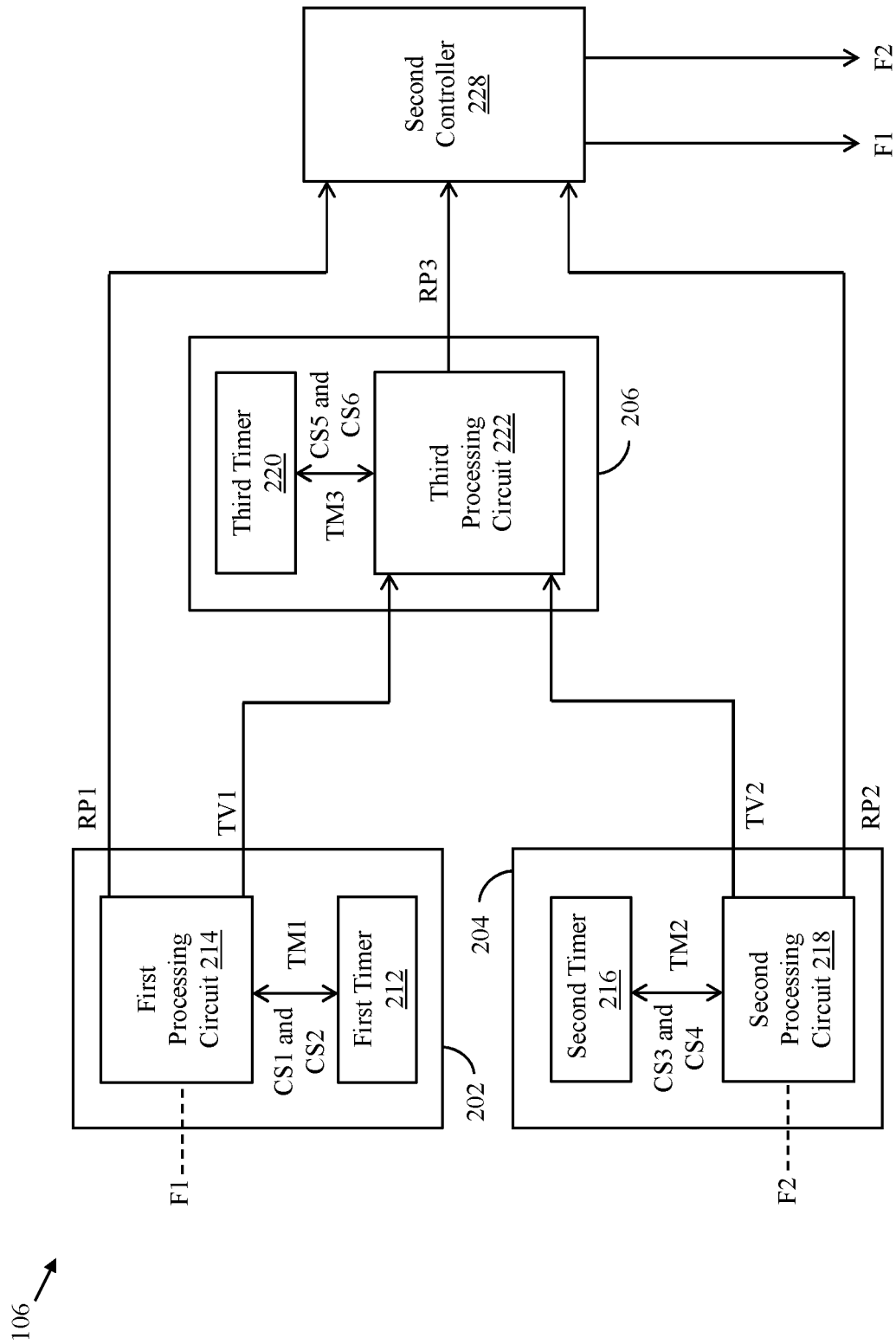
FIG. 2D illustrates a schematic block diagram of the fault recovery system of the electronic circuitry of FIG. 1 in accordance with yet another embodiment of the present disclosure.

FIG. 2A illustrates a schematic block diagram of the fault recovery system 106 in accordance with an embodiment of the present disclosure. The fault recovery system 106 can include first through fourth fault management circuits 202-208, and a first controller 210. The fault recovery system 106 of FIG. 2A is included on a PCB.

The first and second fault management circuits 202 and 204 can be coupled with the first and second functional circuits 102 and 104, respectively. The first and second fault management circuits 202 and 204 can be configured to detect the first and second faults F1 and F2 in the first and second functional circuits 102 and 104, respectively. Based on the detection of the first fault F1, the first fault management circuit 202 can be further configured to execute a first recovery operation to recover the first functional circuit 102 from the first fault F1. Similarly, based on the detection of the second fault F2, the second fault management circuit 204 can be further configured to execute a second recovery operation to recover the second functional circuit 104 from the second fault F2. The first fault management circuit 202 can include a first timer 212 and a first processing circuit 214, and the second fault management circuit 204 can include a second timer 216 and a second processing circuit 218.

The first timer 212 can be coupled with the first processing circuit 214. The first timer 212 can include suitable circuitry that can be configured to execute one or more operations. For example, the first timer 212 can be configured to generate a first timer count (not shown). The first timer count is periodically incremented. The first timer 212 can be further configured to receive a first control signal CS1 from the first processing circuit 214. Upon receiving the first control signal CS1, the first timer 212 is activated (i.e., the first timer count is generated at a first predetermined value (not shown)). In an embodiment, the first timer 212 is activated when the first control signal CS1 is activated (e.g., the first control signal CS1 is at a logic high state).

When the first timer count is equal to a first threshold value (not shown) (i.e., when the first timer 212 times out), the first timer 212 can be further configured to generate and provide a first time-out signal TM1 to the first processing circuit 214. The time taken by the first timer count to update from the first predetermined value to the first threshold value can be equal to a first predetermined time duration (not shown). In such a scenario, equality of the first timer count and the first threshold value can be indicative of the failure of the first fault management circuit 202 (i.e., the first processing circuit 214) to execute the first recovery operation within the first predetermined time duration. The first predetermined time duration can be equal to a time budget associated with the first fault management circuit 202.

The first timer 212 can be further configured to receive a second control signal CS2 from the first processing circuit 214. The first timer 212 can receive the second control signal CS2 when the first fault management circuit 202 successfully executes the first recovery operation within the first predetermined time duration or as a response to the first time-out signal TM1. Upon receiving the second control signal CS2, the first timer 212 can be deactivated. In an embodiment, the first timer 212 is deactivated when the second control signal CS2 is activated (e.g., the second control signal CS2 is at a logic high state).

The first processing circuit 214 can be coupled with the first functional circuit 102, the first timer 212, the third and fourth fault management circuits 206 and 208, and the first controller 210. The first processing circuit 214 can include suitable circuitry that can be configured to execute one or more operations. For example, the first processing circuit 214 can be configured to detect the first fault F1 in the first functional circuit 102. Based on the detection of the first fault F1, the first processing circuit 214 can be further configured to generate and provide the first control signal CS1 to the first timer 212 to activate the first timer 212. Additionally, the first processing circuit 214 can be configured to generate and provide, when the first fault F1 is detected, a first fault detection signal FD1 to the third and fourth fault management circuits 206 and 208. The first fault detection signal FD1 can be indicative of the detection of the first fault F1 in the first functional circuit 102. In an embodiment, the first processing circuit 214 activates the first fault detection signal FD1 (e.g., generates the first fault detection signal FD1 at a logic high state) when the first fault F1 is detected.

While the first timer 212 is activated, the first processing circuit 214 can be further configured to execute the first recovery operation to recover the first functional circuit 102 from the first fault F1. In an example, the first recovery operation corresponds to a reset of the first functional circuit 102. To successfully recover the first functional circuit 102 from the first fault F1, the first processing circuit 214 is required to execute the first recovery operation within the first predetermined time duration (i.e., the time budget associated with the first fault management circuit 202). For the sake of ongoing discussion, it is assumed that the first processing circuit 214 is unsuccessful in executing the first recovery operation within the first predetermined time duration. In such a scenario, the first processing circuit 214 can be further configured to receive the first time-out signal TM1 from the first timer 212 after the lapse of the first predetermined time duration.

When the first time-out signal TM1 is received, the first processing circuit 214 can be further configured to generate and provide the second control signal CS2 to the first timer 212 to deactivate the first timer 212. Further, the first processing circuit 214 can be configured to generate and provide, when the first time-out signal TM1 is received, a first trigger signal TR1 to the third fault management circuit

206. The first trigger signal TR1 can be indicative of the failure of the first fault management circuit 202 to execute the first recovery operation within the first predetermined time duration. In an embodiment, the first processing circuit 214 activates the first trigger signal TR1 (e.g., generates the first trigger signal TR1 at a logic high state) when the first time-out signal TM1 is received.

The first processing circuit 214 can be further configured to generate first reporting data RP1 based on the execution of the first recovery operation. The first reporting data RP1 can include information associated with the first recovery operation. In one example, the first reporting data RP1 can include a first set of bits (not shown) that can be indicative of a time instance at which the first fault F1 is detected, and a second set of bits (not shown) that can be indicative of the first predetermined time duration, Further, the first reporting data RP1 can include a third set of bits (not shown) that can be indicative of whether the recovery of the first functional circuit 102 from the first fault F1 is successful. The first processing circuit 214 can be further configured to provide the first reporting data RP1 to the first controller 210.

The second timer 216 can be coupled with the second processing circuit 218. The second timer 216 can include suitable circuitry that can be configured to execute one or more operations. For example, the second timer 216 can be configured to generate a second timer count (not shown). The second timer count is periodically incremented. The second timer 216 can be further configured to receive a third control signal CS3 from the second processing circuit 218. Upon receiving the third control signal CS3, the second timer 216 is activated (i.e., the second timer count is generated at a second predetermined value (not shown)). In an embodiment, the second timer 216 is activated when the third control signal CS3 is activated (e.g., the third control signal CS3 is at a logic high state).

When the second timer count is equal to a second threshold value (not shown) (i.e., when the second timer 216 times out), the second timer 216 can be further configured to generate and provide a second time-out signal TM2 to the second processing circuit 218. The time taken by the second timer count to update from the second predetermined value to the second threshold value can be equal to a second predetermined time duration (not shown). In such a scenario, equality of the second timer count and the second threshold value can be indicative of the failure of the second fault management circuit 204 (i.e., the second processing circuit 218) to execute the second recovery operation within the second predetermined time duration. The second predetermined time duration can be equal to a time budget associated with the second fault management circuit 204.

The second timer 216 can be further configured to receive a fourth control signal CS4 from the second processing circuit 218. The second timer 216 can receive the fourth control signal CS4 when the second fault management circuit 204 successfully executes the second recovery operation within the second predetermined time duration or as a response to the second time-out signal TM2. Upon receiving the fourth control signal CS4, the second timer 216 can be deactivated. In an embodiment, the second timer 216 is deactivated when the fourth control signal CS4 is activated (e.g., the fourth control signal CS4 is at a logic high state).

The second processing circuit 218 can be coupled with the second functional circuit 104, the second timer 216, the third and fourth fault management circuits 206 and 208, and the first controller 210. The second processing circuit 218 can include suitable circuitry that can be configured to execute one or more operations. For example, the second processing circuit 218 can be configured to detect the second fault F2 in the second functional circuit 104. Based on the detection of the second fault F2, the second processing circuit 218 can be further configured to generate and provide the third control signal CS3 to the second timer 216 to activate the second timer 216. Additionally, the second processing circuit 218 can be configured to generate and provide, when the second fault F2 is detected, a second fault detection signal FD2 to the third and fourth fault management circuits 206 and 208. The second fault detection signal FD2 can be indicative of the detection of the second fault F2 in the second functional circuit 104. In an embodiment, the second processing circuit 218 activates the second fault detection signal FD2 (e.g., generates the second fault detection signal FD2 at a logic high state) when the second fault F2 is detected.

While the second timer 216 is activated, the second processing circuit 218 can be further configured to execute the second recovery operation to recover the second functional circuit 104 from the second fault F2. In an example, the second recovery operation corresponds to a reset of the second functional circuit 104. To successfully recover the second functional circuit 104 from the second fault F2, the second processing circuit 218 is required to execute the second recovery operation within the second predetermined time duration (i.e., the time budget associated with the second fault management circuit 204). For the sake of ongoing discussion, it is assumed that the second processing circuit 218 is unsuccessful in executing the second recovery operation within the second predetermined time duration. In such a scenario, the second processing circuit 218 can be further configured to receive the second time-out signal TM2 from the second timer 216 after the lapse of the second predetermined time duration.

When the second time-out signal TM2 is received, the second processing circuit 218 can be further configured to generate and provide the fourth control signal CS4 to the second timer 216 to deactivate the second timer 216. Additionally, the second processing circuit 218 can be further configured to generate and provide, when the second time-out signal TM2 is received, a second trigger signal TR2 to the third fault management circuit 206. The second trigger signal TR2 can be indicative of a failure of the second fault management circuit 204 to execute the second recovery operation within the second predetermined time duration. In an embodiment, the second processing circuit 218 activates the second trigger signal TR2 (e.g., generates the second trigger signal TR2 at a logic high state) when the second time-out signal TM2 is received.

The second processing circuit 218 can be further configured to generate second reporting data RP2 based on the execution of the second recovery operation. The second reporting data RP2 can include information associated with the second recovery operation. For example, the second reporting data RP2 can include a fourth set of bits (not shown) that can be indicative of a time instance at which the second fault F2 is detected, and a fifth set of bits (not shown) that can be indicative of the second predetermined time duration. Further, the second reporting data RP2 can include a sixth set of bits (not shown) that can be indicative of whether the recovery of the second functional circuit 104 from the second fault F2 is successful. The second processing circuit 218 can be further configured to provide the second reporting data RP2 to the first controller 210.

The third fault management circuit 206 can be coupled with the first and second fault management circuits 202 and 204 (i.e., the first and second processing circuits 214 and 218), the fourth fault management circuit 208, and the first controller 210. The third fault management circuit 206 can be configured to execute a third recovery operation to recover the first functional circuit 102 from the first fault F1. In an example, the third recovery operation can correspond to a reset of a partition (not shown) that includes the first functional circuit 102. The third recovery operation can be executed based on the failure of the first fault management circuit 202 to execute the first recovery operation within the first predetermined time duration. In other words, the third fault management circuit 206 can execute the third recovery operation based on the first fault detection signal FD1 and the first trigger signal TR1. Similarly, the third fault management circuit 206 can be configured to execute a fourth recovery operation to recover the second functional circuit 104 from the second fault F2 based on the failure of the second fault management circuit 204 to execute the second recovery operation within the second predetermined time duration. In other words, the third fault management circuit 206 can execute the fourth recovery operation based on the second fault detection signal FD2 and the second trigger signal TR2. In an example, the fourth recovery operation can correspond to a reset of a partition (not shown) that includes the second functional circuit 104.

The second fault F2 can be detected after or before the first functional circuit 102 is recovered from the first fault F1. When the second fault F2 is detected after the first functional circuit 102 is recovered from the first fault F1, the third fault management circuit 206 can execute the third and fourth recovery operations independently (i.e., not within a same time budget associated with the third fault management circuit 206). For example, the first functional circuit 102 can be successfully recovered from the first fault F1 when the third fault management circuit 206 can execute the third recovery operation within a third predetermined time duration. In such a scenario, the time budget associated with the third fault management circuit 206 can be equal to a sum of the first and third predetermined time durations. Similarly, the second functional circuit 104 can be successfully recovered from the second fault F2 when the third fault management circuit 206 can execute the fourth recovery operation within a fourth predetermined time duration. In such a scenario, the time budget associated with the third fault management circuit 206 can be equal to a sum of the second and fourth predetermined time durations.

The recovery of the first functional circuit 102 from the first fault F1 can be unsuccessful when the execution of the third recovery operation exceeds the third predetermined time duration. When the recovery of the first functional circuit 102 from the first fault F1 by the third fault management circuit 206 is unsuccessful, the third fault management circuit 206 can be further configured to generate a third trigger signal TR3. The third trigger signal TR3 can be indicative of a lapse of the time budget associated with the third fault management circuit 206. Similarly, the recovery of the second functional circuit 104 from the second fault F2 is unsuccessful when the execution of the fourth recovery operation exceeds the fourth predetermined time duration. When the recovery of the second functional circuit 104 from the second fault F2 by the third fault management circuit 206 is unsuccessful, the third fault management circuit 206 can be further configured to generate the third trigger signal TR3.

When the second fault F2 is detected before the first functional circuit 102 is recovered from the first fault F1, the third fault management circuit 206 is required to execute the third and fourth recovery operations sequentially. Further, the first and second functional circuits 102 and 104 are successfully recovered from the first and second faults F1 and F2 when the third fault management circuit 206 can execute both the third and fourth recovery operations within the third predetermined time duration. The third fault management circuit 206 executes the third recovery operation before the fourth recovery operation, and the third recovery operation is executed on receiving the first trigger signal TR1. As a result, the third fault management circuit 206 has the third predetermined time duration to execute the third and fourth recovery operations. The recoveries of the first and second functional circuits 102 and 104 from the first and second faults F1 and F2, respectively, are unsuccessful when the execution of the third and fourth recovery operations exceeds the third predetermined time duration. When the recoveries of the first and second functional circuits 102 and 104 are unsuccessful, the third fault management circuit 206 can be further configured to generate the third trigger signal TR3. The third fault management circuit 206 can include a third timer 220 and a third processing circuit 222.

The third timer 220 can be coupled with the third processing circuit 222. The third timer 220 can include suitable circuitry that can be configured to execute one or more operations. For example, the third timer 220 can be configured to generate a third timer count (not shown). The third timer count is periodically incremented. The third timer 220 can be further configured to receive a fifth control signal CS5 from the third processing circuit 222. Upon receiving the fifth control signal CS5, the third timer 220 is activated (i.e., the third timer count is generated at a third predetermined value (not shown)). In an embodiment, the third timer 220 is activated when the fifth control signal CS5 is activated (e.g., the fifth control signal CS5 is at a logic high state).

When the third timer count is equal to a third threshold value (not shown) (i.e., when the third timer 220 times out), the third timer 220 can be further configured to generate and provide a third time-out signal TM3 to the third processing circuit 222. The time taken by the third timer count to update from the third predetermined value to the third threshold value can be equal to the sum of the first and third predetermined time durations. In such a scenario, equality of the third timer count and the third threshold value can be indicative of the failure of the third fault management circuit 206 (i.e., the third processing circuit 222) to execute the third recovery operation or the third and fourth recovery operations within the third predetermined time duration. Further, the time taken by the third timer count to update from the third predetermined value to the third threshold value can be equal to the sum of the second and fourth predetermined time durations. In such a scenario, equality of the third timer count and the third threshold value can be indicative of the failure of the third fault management circuit 206 (i.e., the third processing circuit 222) to execute the fourth recovery operation within the fourth predetermined time duration.

The third timer 220 can be further configured to receive a sixth control signal CS6 from the third processing circuit 222. Upon receiving the sixth control signal CS6, the third timer 220 is deactivated. In an embodiment, the third timer 220 is deactivated when the sixth control signal CS6 is activated (e.g., the sixth control signal CS6 is at a logic high state).

The third processing circuit 222 can be coupled with the first and second fault management circuits 202 and 204 (i.e., the first and second processing circuits 214 and 218), the third timer 220, the fourth fault management circuit 208, and the first controller 210. The third processing circuit 222 can include suitable circuitry that can be configured to execute one or more operations. For example, the third processing circuit 222 can be configured to receive the first fault detection signal FD1 and the first trigger signal TR1 from the first processing circuit 214. The third processing circuit 222 can receive the first fault detection signal FD1 when the first fault F1 is detected. Further, the third processing circuit 222 can receive the first trigger signal TR1 after the lapse of the first predetermined time duration. When the first fault detection signal FD1 is received, the third processing circuit 222 can be further configured to generate and provide the fifth control signal CS5 to the third timer 220 to activate the third timer 220. Further, when the first trigger signal TR1 is received, the third processing circuit 222 can be configured to execute the third recovery operation.

To successfully recover the first functional circuit 102 from the first fault F1, the third processing circuit 222 is required to execute the third recovery operation within the third predetermined time duration. For the sake of ongoing discussion, it is assumed that the third processing circuit 222 is unsuccessful in executing the third recovery operation within the third predetermined time duration. In such a scenario, the third processing circuit 222 can be further configured to receive the third time-out signal TM3 from the third timer 220 after the lapse of the time budget associated with the third fault management circuit 206.

When the third time-out signal TM3 is received, the third processing circuit 222 can be further configured to generate and provide the sixth control signal CS6 to the third timer 220 to deactivate the third timer 220. Further, the third processing circuit 222 can be configured to generate and provide, when the third time-out signal TM3 is received, the third trigger signal TR3 to the fourth fault management circuit 208. The third trigger signal TR3 can be indicative of the lapse of the time budget associated with the third fault management circuit 206. In other words, the third trigger signal TR3 can be indicative of the failure of the third fault management circuit 206 to execute the third recovery operation within the third predetermined time duration. In an embodiment, the third processing circuit 222 activates the third trigger signal TR3 (e.g., generates the third trigger signal TR3 at a logic high state) when the third time-out signal TM3 is received.

The third processing circuit 222 can be further configured to receive the second fault detection signal FD2 and the second trigger signal TR2 from the second processing circuit 218. The third processing circuit 222 can receive the second fault detection signal FD2 when the second fault F2 is detected. Further, the third processing circuit 222 can receive the second trigger signal TR2 after the lapse of the second predetermined time duration. When the second fault detection signal FD2 is received, the third processing circuit 222 can be further configured to generate and provide the fifth control signal CS5 to the third timer 220 to activate the third timer 220. Further, when the second trigger signal TR2 is received, the third processing circuit 222 can be configured to execute the fourth recovery operation.

To successfully recover the second functional circuit 104 from the second fault F2, the third processing circuit 222 is required to execute the fourth recovery operation within the fourth predetermined time duration. For the sake of ongoing discussion, it is assumed that the third processing circuit 222 is unsuccessful in executing the fourth recovery operation within the fourth predetermined time duration. In such a scenario, the third processing circuit 222 can be further configured to receive the third time-out signal TM3 from the third timer 220 after the lapse of the time budget associated with the third fault management circuit 206. When the third time-out signal TM3 is received, the third processing circuit 222 can be further configured to generate and provide the sixth control signal CS6 to the third timer 220 to deactivate the third timer 220. Further, the third processing circuit 222 can be configured to generate and provide, when the third time-out signal TM3 is received, the third trigger signal TR3 to the fourth fault management circuit 208. In such a scenario, the third trigger signal TR3 can be indicative of the failure of the third fault management circuit 206 to execute the fourth recovery operation within the fourth predetermined time duration. The recoveries of the first and second functional circuits 102 and 104 from the first and second faults F1 and F2 are attempted by the third processing circuit 222 in an above-described manner when the second fault F2 is detected after the recovery of the first functional circuit 102 from the first fault F1.

When the second fault F2 is detected before the first functional circuit 102 is recovered from the first fault F1, the third processing circuit 222 can be further configured to generate and provide the fifth control signal CS5 to the third timer 220 to activate the third timer 220 on receiving the first fault detection signal FD1. In such a scenario, the reception of the second fault detection signal FD2 does not alter the operation of the third timer 220. Further, when the first trigger signal TR1 is received, the third processing circuit 222 can be configured to execute the third recovery operation. The third processing circuit 222 can be further configured to execute the fourth recovery operation exclusively after the execution of the third recovery operation, provided that the second trigger signal TR2 is received from the second processing circuit 218.

To successfully recover the first and second functional circuits 102 and 104 from the first and second faults F1 and F2, respectively, the third processing circuit 222 is required to execute both the third and fourth recovery operations within the third predetermined time duration. For the sake of ongoing discussion, it is assumed that the third processing circuit 222 is unsuccessful in executing the third and fourth recovery operations within the third predetermined time duration. In such a scenario, the third processing circuit 222 can be further configured to receive the third time-out signal TM3 from the third timer 220 after the lapse of the time budget associated with the third fault management circuit 206. When the third time-out signal TM3 is received, the third processing circuit 222 can be further configured to generate and provide the sixth control signal CS6 to the third timer 220 to deactivate the third timer 220. Further, the third processing circuit 222 can be configured to generate and provide, when the third time-out signal TM3 is received, the third trigger signal TR3 to the fourth fault management circuit 208. In such a scenario, the third trigger signal TR3 can be indicative of the failure of the third fault management circuit 206 to execute the third and fourth recovery operations within the third predetermined time duration.

The third processing circuit 222 can be further configured to generate third reporting data RP3 based on the execution of the third and fourth recovery operations. The third reporting data RP3 can include information associated with the third and fourth recovery operations. For example, the third reporting data RP3 can include a seventh set of bits (not shown) that can be indicative of time instances at which the first and second faults F1 and F2 are detected, and an eighth set of bits (not shown) that can be indicative of the third and fourth predetermined time durations. Further, the third reporting data RP3 can include a ninth set of bits (not shown) that can be indicative of whether the recoveries of the first and second functional circuits 102 and 104 are successful. The third processing circuit 222 can be further configured to provide the third reporting data RP3 to the first controller 210.

Although it is described that the first through third fault management circuits 202-206 fail to recover the first and second functional circuits 102 and 104 from the first and second faults F1 and F2, respectively, it will be apparent to a person skilled in the art that the scope of the present disclosure is not limited to it. In various other embodiments, the first functional circuit 102 can be successfully recovered from the first fault F1 by the first or third fault management circuit 202 or 206, without deviating from the scope of the present disclosure. Similarly, the second functional circuit 104 can be successfully recovered from the second fault F2 by the second or third fault management circuit 204 or 206, without deviating from the scope of the present disclosure.

The fourth fault management circuit 208 can be coupled with the third fault management circuit 206 (i.e., the third processing circuit 222) and the first controller 210. The fourth fault management circuit 208 can be configured to execute a fifth recovery operation to recover the first and second functional circuits 102 and 104 from the first and second faults F1 and F2, respectively. In an example, the fifth recovery operation corresponds to a reset of a partition (not shown) including the first and second functional circuits 102 and 104 and the first through third fault management circuits 202-206.

The fifth recovery operation can be executed based on the failure of the third fault management circuit 206 to execute the third and fourth recovery operations within the third and fourth predetermined time durations, respectively, when the second fault F2 is detected after the first functional circuit 102 is recovered from the first fault F1. In other words, the fourth fault management circuit 208 executes the fifth recovery operation based on the first fault detection signal FD1 and the third trigger signal TR3 for the first fault F1 and the second fault detection signal FD2 and the third trigger signal TR3 for the second fault F2. Similarly, when the second fault F2 is detected before the first functional circuit 102 is recovered from the first fault F1, the fifth recovery operation can be executed based on the failure of the third fault management circuit 206 to execute the third and fourth recovery operations within the third predetermined time duration. The fourth fault management circuit 208 is required to execute the fifth recovery operation within a fifth predetermined time duration to successfully recover one or both the first and second functional circuits 102 and 104 from the first and second faults F1 and F2, respectively. Further, the recoveries of the first and second functional circuits 102 and 104 from the first and second faults F1 and F2, respectively, are unsuccessful when the execution of the fifth recovery operation exceeds the fifth predetermined time duration.

When the second fault F2 is detected after the first functional circuit 102 is recovered from the first fault F1, a time budget associated with the fourth fault management circuit 208 can be equal to a sum of the first, third, and fifth predetermined time durations or a sum of the second, fourth, and fifth predetermined time durations. When the second fault F2 is detected before the first functional circuit 102 is recovered from the first fault F1, the time budget associated with the fourth fault management circuit 208 can be equal to the sum of the first, third, and fifth predetermined time durations. In such a scenario, a maximum recovery time associated with the fault recovery system 106 can be equal to the time budget associated with the fourth fault management circuit 208. The maximum recovery time associated with the fault recovery system 106 can correspond to a fault handling time interval (FHTI) associated with the fault recovery system 106. The fourth fault management circuit 208 can include a fourth timer 224 and a fourth processing circuit 226.

The fourth timer 224 can be coupled with the fourth processing circuit 226. The fourth timer 224 can include suitable circuitry that can be configured to execute one or more operations. For example, the fourth timer 224 can be configured to generate a fourth timer count (not shown). The fourth timer count is periodically incremented. The fourth timer 224 can be further configured to receive a seventh control signal CS7 from the fourth processing circuit 226. Upon receiving the seventh control signal CS7, the fourth timer 224 is activated (i.e., the fourth timer count is generated at a fourth predetermined value (not shown)). In an embodiment, the fourth timer 224 is activated when the seventh control signal CS7 is activated (e.g., the seventh control signal CS7 is at a logic high state).

When the fourth timer count is equal to a fourth threshold value (not shown) (i.e., when the fourth timer 224 times out), the fourth timer 224 can be further configured to generate and provide a fourth time-out signal TM4 to the fourth processing circuit 226. The time taken by the fourth timer count to update from the fourth predetermined value to the fourth threshold value can be equal to the sum of the first, third, and fifth predetermined time durations or the sum of the second, fourth, and fifth predetermined time durations. In such a scenario, equality of the fourth timer count and the fourth threshold value can be indicative of the failure of the fourth fault management circuit 208 (i.e., the fourth processing circuit 226) to execute the fifth recovery operation within the fifth predetermined time duration.

The fourth timer 224 can be further configured to receive an eighth control signal CS8 from the fourth processing circuit 226. The fourth timer 224 receives the eighth control signal CS8 when the fourth fault management circuit 208 successfully executes the fifth recovery operation within the fifth predetermined time duration or as a response to the fourth time-out signal TM4. Upon receiving the eighth control signal CS8, the fourth timer 224 can be deactivated. In an embodiment, the fourth timer 224 is deactivated when the eighth control signal CS8 is activated (e.g., the eighth control signal CS8 is at a logic high state).

The fourth processing circuit 226 can be coupled with the first through third fault management circuits 202-206 (i.e., the first through third processing circuits 214, 218, and 222), the fourth timer 224, and the first controller 210. The fourth processing circuit 226 can include suitable circuitry that can be configured to execute one or more operations. For example, the fourth processing circuit 226 can be configured to receive the first fault detection signal FD1 from the first processing circuit 214 and the third trigger signal TR3 from the third processing circuit 222. The fourth processing circuit 226 can receive the first fault detection signal FD1 when the first fault F1 is detected. Further, the fourth processing circuit 226 can receive the third trigger signal TR3 after the lapse of the time budget associated with the third fault management circuit 206. When the first fault detection signal FD1 is received, the fourth processing circuit 226 can be further configured to generate and provide the seventh control signal CS7 to the fourth timer 224 to activate the fourth timer 224. Further, when the third trigger signal TR3 is received, the fourth processing circuit 226 can be configured to execute the fifth recovery operation.

To successfully recover the first functional circuit 102 from the first fault F1, the fourth processing circuit 226 is required to execute the fifth recovery operation within the fifth predetermined time duration. For the sake of ongoing discussion, it is assumed that the fourth processing circuit 226 executes the fifth recovery operation within the fifth predetermined time duration. In such a scenario, the fourth processing circuit 226 can be further configured to generate and provide the eighth control signal CS8 to the fourth timer 224 to deactivate the fourth timer 224. The recovery of the first functional circuit 102 from the first fault F1 is thus successful.

The fourth processing circuit 226 can be further configured to receive, for the second fault F2, the second fault detection signal FD2 from the second processing circuit 218, and the third trigger signal TR3 from the third processing circuit 222. The fourth processing circuit 226 receives the second fault detection signal FD2 when the second fault F2 is detected. Further, the fourth processing circuit 226 receives the third trigger signal TR3 after the lapse of the time budget associated with the third fault management circuit 206. When the second fault detection signal FD2 is received, the fourth processing circuit 226 can be further configured to generate and provide the seventh control signal CS7 to the fourth timer 224 to activate the fourth timer 224. Further, when the third trigger signal TR3 is received, the fourth processing circuit 226 can be configured to execute the fifth recovery operation.

To successfully recover the second functional circuit 104 from the second fault F2, the fourth processing circuit 226 is required to execute the fifth recovery operation within the fifth predetermined time duration. For the sake of ongoing discussion, it is assumed that the fourth processing circuit 226 executes the fifth recovery operation within the fifth predetermined time duration. In such a scenario, the fourth processing circuit 226 can be further configured to generate and provide the eighth control signal CS8 to the fourth timer 224 to deactivate the fourth timer 224. The recovery of the second functional circuit 104 from the second fault F2 is thus successful. The first and second functional circuits 102 and 104 are thus recovered from the first and second faults F1 and F2 by the fourth processing circuit 226 when the second fault F2 is detected after the recovery of the first functional circuit 102.

When the second fault F2 is detected before the recovery of the first functional circuit 102, the fourth processing circuit 226 can be further configured to generate and provide the seventh control signal CS7 to the fourth timer 224 to activate the fourth timer 224. The fourth processing circuit 226 can generate and provide the seventh control signal CS7 to the fourth timer 224 on receiving the first fault detection signal FD1. Further, when the third trigger signal TR3 is received, the fourth processing circuit 226 can be configured to execute the fifth recovery operation. To successfully recover the first and second functional circuits 102 and 104 from the first and second faults F1 and F2, respectively, the fourth processing circuit 226 is required to execute the fifth recovery operation within the fifth predetermined time duration. For the sake of ongoing discussion, it is assumed that the fourth processing circuit 226 executes the fifth recovery operation within the fifth predetermined time duration. In such a scenario, the fourth processing circuit 226 can be further configured to generate and provide the eighth control signal CS8 to the fourth timer 224 to deactivate the fourth timer 224. The recoveries of the first and second functional circuits 102 and 104 from the first and second faults F1 and F2 are thus successful.

Although it is described that the fourth fault management circuit 208 successfully recovers the first and second functional circuits 102 and 104 from the first and second faults F1 and F2, respectively, it will be apparent to a person skilled in the art that the scope of the present disclosure is not limited to it. In an alternate embodiment, the execution of the fifth recovery operation can exceed the fifth predetermined time duration, without deviating from the scope of the present disclosure. In such a scenario, the fourth timer 224 can generate and provide the fourth time-out signal TM4 to the fourth processing circuit 226 after the lapse of the time budget associated with the fourth fault management circuit 208. Further, based on the fourth time-out signal TM4, the fourth processing circuit 226 can be further configured to generate and provide a first indication signal (not shown) to a first core circuit (not shown) of the electronic circuitry 100. The first core circuit can be configured to reset the electronic circuitry 100 based on the first indication signal.

The fourth processing circuit 226 can be further configured to generate fourth reporting data RP4 based on the execution of the fifth recovery operation. The fourth reporting data RP4 can include information associated with the fifth recovery operation. For example, the fourth reporting data RP4 can include a tenth set of bits (not shown) that can be indicative of time instances at which the first and second faults F1 and F2 are detected, and an eleventh set of bits (not shown) that can be indicative of the fifth predetermined time duration. Further, the fourth reporting data RP4 can include a twelfth set of bits (not shown) that can be indicative of whether the recoveries of the first and second functional circuits 102 and 104 are successful. The fourth processing circuit 226 can be further configured to provide the fourth reporting data RP4 to the first controller 210.

The first through fourth fault management circuits 202-208 can thus form a hierarchical structure for facilitating fault recoveries of various functional circuits of the fault recovery system 106. In an exemplary scenario, the time budgets associated with the first through fourth fault management circuits 202-208 are 5 milliseconds (ms), 7 ms, 15 ms, and 20 ms, respectively. Further, it is assumed that the second fault F2 is detected 3 ms after the detection of the first fault F1. Thus, the first processing circuit 214 can detect the first fault F1 in the first functional circuit 102, and generate and provide the first control signal CS1 to the first timer 212 to activate the first timer 212. The first processing circuit 214 can further generate and provide the first fault detection signal FD1 to the third and fourth processing circuits 222 and 226 when the first fault F1 is detected. Based on the first fault detection signal FD1, the third and fourth processing circuits 222 and 226 can generate and provide the fifth and seventh control signals CS5 and CS7 to the third and fourth timers 220 and 224, respectively. While the first timer 212 is activated, the first processing circuit 214 executes the first recovery operation.

After the lapse of 3 ms, the second processing circuit 218 can detect the second fault F2 in the second functional circuit 104, and generate and provide the third control signal CS3 to the second timer 216 to activate the second timer 216. Based on the detection of the second fault F2, the second processing circuit 218 can further generate and provide the second fault detection signal FD2 to the third and fourth processing circuits 222 and 226.

For the sake of ongoing discussion, it is assumed that the recovery from the first fault F1 exceeds the time budget associated with the first fault management circuit 202. Thus, after the lapse of 5 ms, the first processing circuit 214 can receive the first time-out signal TM1 from the first timer 212.

On receiving the first time-out signal TM1, the first processing circuit 214 can generate and provide the first trigger signal TR1 to the third processing circuit 222 to indicate the failure of the first fault management circuit 202 to recover the first functional circuit 102 from the first fault F1. The first processing circuit 214 can further generate and provide the second control signal CS2 to deactivate the first timer 212. On receiving the first trigger signal TR1, the third processing circuit 222 can execute the third recovery operation to recover the first functional circuit 102 from the first fault F1.

For the sake of ongoing discussion, it is assumed that the recovery from the second fault F2 exceeds the time budget associated with the second fault management circuit 204. Thus, after the lapse of 7 ms, the second processing circuit 218 can receive the second time-out signal TM2 from the second timer 216. On receiving the second time-out signal TM2, the second processing circuit 218 can generate and provide the second trigger signal TR2 to the third processing circuit 222 to indicate the failure of the second fault management circuit 204 to recover the second functional circuit 104 from the second fault F2. The second processing circuit 218 can further generate and provide the fourth control signal CS4 to the second timer 216 to deactivate the second timer 216. As the third processing circuit 222 is executing the third recovery operation, the reception of the second trigger signal TR2 does not immediately trigger the execution of the fourth recovery operation.

When the first trigger signal TR1 is received, the time taken by the first fault management circuit 202, say 5 ms, has lapsed from the time budget associated with the third fault management circuit 206. To successfully recover the first and second functional circuits 102 and 104 from the first and second faults F1 and F2, respectively, the third processing circuit 222 is required to execute the third and fourth recovery operations within a set time, say 10 ms. For the sake of ongoing discussion, it is assumed that the third processing circuit 222 does not recover the first functional circuit 102 from the first fault F1 in 10 ms.

After the lapse of the third predetermined time duration (i.e., 10 ms after the reception of the first trigger signal TR1), the third processing circuit 222 can receive the third time-out signal TM3 from the third timer 220. On receiving the third time-out signal TM3, the third processing circuit 222 can generate and provide the third trigger signal TR3 to the fourth processing circuit 226. The third trigger signal TR3 can indicate the failure of the third fault management circuit 206 to recover the first and second functional circuits 102 and 104 from the first and second faults F1 and F2, respectively. The third processing circuit 222 can further generate and provide the sixth control signal CS6 to the third timer 220 to deactivate the third timer 220.

On receiving the third trigger signal TR3, the fourth processing circuit 226 can execute the fifth recovery operation to recover the first and second functional circuits 102 and 104 from the first and second faults F1 and F2, respectively. At such a time instance, the time taken by the first fault management circuit 202, say 5 ms, and the time taken by the third fault management circuit 206, say 10 ms, have lapsed from the time budget associated with the fourth fault management circuit 208. In other words, 15 ms have lapsed from the time budget associated with the fourth fault management circuit 208. If the fourth processing circuit 226 can execute the fifth recovery operation within 5 ms, the fourth processing circuit 226 can successfully recover the first and second functional circuits 102 and 104 from the first and second faults F1 and F2, respectively. For the sake of ongoing discussion, it is assumed that the fourth processing circuit 226 executes the fifth recovery operation in 4 ms. Thus, each of the first and second functional circuits 102 and 104 are recovered from the first and second faults F1 and F2 in 19 ms. The fourth processing circuit 226 can then generate and provide the eighth control signal CS8 to the fourth timer 224 to deactivate the fourth timer 224.

When the second fault F2 is detected after the first functional circuit 102 is recovered from the first fault F1, it will be apparent to a person skilled in the art that the recovery of the first functional circuit 102 from the first fault F1 can take 19 ms (i.e., 5 ms taken by the first fault management circuit 202, 10 ms taken by the third fault management circuit 206, and 4 ms taken by the fourth fault management circuit 208). The recovery of the second functional circuit 104 from the second fault F2 can however take less than 19 ms if the third fault management circuit 206 (i.e., the fourth processing circuit 226) can execute the fourth recovery operation within 10 ms.

The first controller 210 can be coupled with the first through fourth fault management circuits 202-208 (i.e., the first through fourth processing circuits 214, 218, 222, and 226) and the first and second functional circuits 102 and 104. The first controller 210 can include suitable circuitry that can be configured to execute one or more operations. For example, the first controller 210 can be configured to receive the first through fourth reporting data RP1-RP4 from the first through fourth fault management circuits 202-208, respectively.

The first controller 210 can be further configured to record a first operational state associated with the fault recovery system 106. The first operational state can be associated with the first and second fault management circuits 202 and 204 executing the first and second recovery operations, respectively. The first operational state can be further associated with the third fault management circuit 206 executing the third and fourth recovery operations, and the fourth fault management circuit 208 executing the fifth recovery operation. In an example, the first operational state corresponds to the first and second functional circuits 102 and 104 being memories.

The first controller 210 can be further configured to record a first set of rules associated with the first fault F1 and a second set of rules associated with the second fault F2. In an example, when the first functional circuit 102 is a memory, the first set of rules can include the first and third recovery operations being the reset of the first functional circuit 102 and the reset of the partition including the first functional circuit 102, respectively. The first set of rules can further include the fifth recovery operation being the reset of the partition including the first and second functional circuits 102 and 104 and the first through third fault management circuits 202-206. Similarly, when the second functional circuit 104 is a memory, the second set of rules can include the second and fourth recovery operations being the reset of the second functional circuit 104 and the reset of the partition including the second functional circuit 104, respectively. The second set of rules can further include the fifth recovery operation being the reset of the partition including the first and second functional circuits 102 and 104 and the first through third fault management circuits 202-206.

The first controller 210 can be further coupled with first through fourth monitoring circuits (not shown) of the fault recovery system 106. The first through fourth monitoring circuits can be coupled with the first through fourth fault management circuits 202-208, respectively. The first monitoring circuit can be configured to determine availability of the first fault management circuit 202 while the first fault management circuit 202 is executing the first recovery operation, and generate first status data (not shown). Similarly, the second through fourth monitoring circuits can be configured to determine availability of the second through fourth fault management circuits 204-208 while the second through fourth fault management circuits 204-208 are executing the corresponding recovery operations. Further, the second through fourth monitoring circuits can be configured to generate second through fourth status data (not shown) indicative of the determined availability of the second through fourth fault management circuits 204-208, respectively. The first controller 210 can be further configured to receive the first through fourth status data from the first through fourth monitoring circuits, respectively.

The first controller 210 can be further configured to estimate a first sequence of recovery operations to be executed by the first, third, and fourth fault management circuits 202, 206, and 208 for the first fault F1 when the first fault F1 is detected again in the fault recovery system 106. The first sequence of recovery operations can be estimated based on the first operational state, the first set of rules, and the first, third, and fifth predetermined time durations. The first sequence of recovery operations can be further estimated based on the availability of the first, third, and fourth fault management circuits 202, 206, and 208 during the first, third, and fifth recovery operations (i.e., based on the first, third, and fourth status data), respectively. In an embodiment, the first controller 210 can be implemented such that the first sequence of recovery operations is updated after each recovery from the first fault F1 to determine an optimized first sequence of recovery operations to be executed for the first fault F1. In such a scenario, the first controller 210 can be further configured to inject the first fault F1 into the first functional circuit 102. The fault injection can be executed multiple times to increase an accuracy of the estimation.

The first controller 210 can be further configured to estimate a second sequence of recovery operations to be executed by the second through fourth fault management circuits 204-208 for the second fault F2 in a similar manner as described above. Thus, the first controller 210 can be further configured to inject the second fault F2 into the second functional circuit 104.

The first controller 210 can be further configured to update the first and second sets of rules based on the recoveries of the first and second functional circuits 102 and 104 from the first and second faults F1 and F2, respectively. For example, if one rule of the first set of rules is resulting in excessive recovery time, the first controller 210 can delete the corresponding rule from the first set of rules.

It will be apparent to a person skilled in the art that the electronic circuitry 100 is shown to include two functional circuits coupled with two fault management circuits to make the illustrations concise and clear and should not be considered as a limitation of the present disclosure. In various other embodiments, the electronic circuitry 100 can include more than two functional circuits with each functional circuit coupled with a fault management circuit, without deviating from the scope of the present disclosure. In such a scenario, all such fault management circuits can be further coupled with one fault management circuit (i.e., the third fault management circuit 206) or more than one fault management circuit to form a hierarchical structure. Similarly, it will further be apparent to a person skilled in the art that the electronic circuitry 100 is shown to include one partition including the first and second functional circuits 102 and 104 and the first through third fault management circuits 202-206 to make the illustrations concise and clear and should not be considered as a limitation of the present disclosure. In various other embodiments, the electronic circuitry 100 can include more than one such partition, without deviating from the scope of the present disclosure. In such a scenario, the fourth fault management circuit 208 can manage fault recoveries associated with each such partition in a similar manner as described above. Further, the first controller 210 can estimate various sequences of recovery operations for each such partition in a similar manner as described above.

Although it is described that the fault recovery system 106 is included on a PCB, it will be apparent to a person skilled in the art that the scope of the present disclosure is not limited to it. In various other embodiments, the fault recovery system 106 can further include a fifth fault management circuit (not shown) that can be coupled with multiple PCBs for facilitating various recovery operations, without deviating from the scope of the present disclosure. In such a scenario, the fifth fault management circuit and each PCB can be coupled in a wired manner or a wireless manner. Further, in such a fault recovery system 106, the first controller 210 can be external to the PCBs and can control various operations of the PCBs.

FIG. 2B illustrates a schematic block diagram of the fault recovery system 106 in accordance with another embodiment of the present disclosure. The fault recovery system 106 can include the first through fourth fault management circuits 202-208, the first controller 210, and the first through fourth monitoring circuits. The fault recovery system 106 of FIG. 2B is included on a PCB.

The difference between the fault recovery system 106 of FIG. 2B and the fault recovery system 106 of FIG. 2A is in a manner in which the failure of the first through third fault management circuits 202-206 is indicated to a subsequent fault management circuit in the hierarchy. When the first fault management circuit 202 fails to recover the first functional circuit 102 from the first fault F1 (i.e., when the first time-out signal TM1 is received), the first processing circuit 214 can be further configured to generate and provide a first timestamp value TV1 to the third fault management circuit 206. The first timestamp value TV1 can be equal to the first predetermined time duration. In such a scenario, the third fault management circuit 206 (i.e., the third processing circuit 222) can be further configured to execute the third recovery operation based on the first timestamp value TV1. This is in contrast to the execution of the third recovery operation by the third fault management circuit 206 based on the first fault detection signal FD1 and the first trigger signal TR1 that are received when the first fault F1 is detected and when the first timer 212 times out, respectively.

When the second fault management circuit 204 fails to recover the second functional circuit 104 from the second fault F2 (i.e., when the second time-out signal TM2 is received), the second processing circuit 218 can be similarly configured to generate and provide a second timestamp value TV2 to the third fault management circuit 206. The second timestamp value TV2 can be equal to the second predetermined time duration. In such a scenario, the third fault management circuit 206 (i.e., the third processing circuit 222) can be further configured to execute the fourth recovery operation based on the second timestamp value TV2. This is in contrast to the execution of the fourth recovery operation by the third fault management circuit 206 based on the second fault detection signal FD2 and the second trigger signal TR2 in the fault recovery system 106 of FIG. 2A.

In the fault recovery system 106 of FIG. 2B, for the first and second faults F1 and F2, the third processing circuit 222 can be further configured to receive the first and second timestamp values TV1 and TV2 from the first and second processing circuits 214 and 218, respectively. Further, the third processing circuit 222 can be configured to generate and provide the fifth control signal CS5 to the third timer 220 when the first and second timestamp values TV1 and TV2 are received, respectively. While the third timer 220 is activated, the third processing circuit 222 can be further configured to execute the third and fourth recovery operations for the first and second faults F1 and F2, respectively. In such a scenario, the third timer 220 can time out when the third timer count is equal to a fifth threshold value. Further, the time taken by the third timer count to update from the third predetermined value to the fifth threshold value can be equal to the third or fourth predetermined time duration.

When the third fault management circuit 206 fails to recover the first and second functional circuits 102 and 104 (i.e., when the third time-out signal TM3 is received), the third processing circuit 222 can be further configured to generate and provide a third timestamp value TV3 to the fourth fault management circuit 208. When the second fault F2 is detected after the first functional circuit 102 is recovered from the first fault F1, the third timestamp value TV3 can be equal to the sum of the first and third predetermined time durations or the sum of the second and fourth predetermined time durations. Further, when the second fault F2 is detected before the first functional circuit 102 is recovered from the first fault F1, the third timestamp value TV3 can be equal to the sum of the first and third predetermined time durations. The fourth fault management circuit 208 (i.e., the fourth processing circuit 226) can be further configured to execute the fifth recovery operation based on the third timestamp value TV3. This is in contrast to the execution of the fifth recovery operation by the fourth fault management circuit 208 based on the first and second fault detection signals FD1 and FD2 and the third trigger signal TR3 in the fault recovery system 106 of FIG. 2A.

In the fault recovery system 106 of FIG. 2B, for the first and second faults F1 and F2, the fourth processing circuit 226 can be further configured to receive the third timestamp value TV3 from the third processing circuit 222. Further, the fourth processing circuit 226 can be configured to generate and provide the seventh control signal CS7 to the fourth timer 224 when the third timestamp value TV3 is received. While the fourth timer 224 is activated, the fourth processing circuit 226 can be further configured to execute the fifth recovery operation. In such a scenario, the fourth timer 224 can time out when the fourth timer count is equal to a sixth threshold value. Further, the time taken by the fourth timer count to update from the fourth predetermined value to the sixth threshold value can be equal to the fifth predetermined time duration.

FIG. 2C illustrates a schematic block diagram of the fault recovery system 106 in accordance with yet another embodiment of the present disclosure. The fault recovery system 106 can include the first through third fault management circuits 202-206, a second controller 228, and the first through third monitoring circuits. The fault recovery system 106 of FIG. 2C is included on an SoC.

The operations of the first and second functional circuits 102 and 104, the first and second fault management circuits 202 and 204, and the first through third monitoring circuits remain same as described in FIG. 2A. One difference between the fault recovery system 106 of FIG. 2C and the fault recovery system 106 of FIG. 2A is that the first controller 210 in FIG. 2A is replaced with the second controller 228 in FIG. 2C. Another difference between the fault recovery system 106 of FIG. 2C and the fault recovery system 106 of FIG. 2A is in the absence of the fourth fault management circuit 208, and in turn, the fourth monitoring circuit. In such a scenario, when the third fault management circuit 206 fails to recover the first and second functional circuits 102 and 104 from the first and second faults F1 and F2, respectively, the third fault management circuit 206 can be further configured to generate and provide a second indication signal (not shown) to a second core circuit (not shown) of the electronic circuitry 100. The second core circuit can be configured to reset the electronic circuitry 100 based on the second indication signal.

The second controller 228 can be coupled with the first through third processing circuits 214, 218, and 222, and the first through third monitoring circuits. The second controller 228 can be configured to receive the first through third reporting data RP1-RP3 from the first through third processing circuits 214, 218, and 222, respectively. Further, the second controller 228 can be configured to receive the first through third status data from the first through third monitoring circuits, respectively. The second controller 228 can be further configured to record a second operational state associated with the fault recovery system 106. The second operational state can be associated with the first and second fault management circuits 202 and 204 executing the first and second recovery operations, respectively, and the third fault management circuit 206 executing the third and fourth recovery operations. The second controller 228 can be further configured to record a third set of rules associated with the first fault F1 and a fourth set of rules associated with the second fault F2.

The second controller 228 can be further configured to estimate a third sequence of recovery operations to be executed by the first and third fault management circuits 202 and 206 for the first fault F1 when the first fault F1 is detected again. The third sequence of recovery operations can be estimated based on the second operational state, the third set of rules, and the first and third predetermined time durations. The third sequence of recovery operations can be further estimated based on the availability of the first and third fault management circuits 202 and 206 during the first and third recovery operations (i.e., based on the first and third status data), respectively. In an embodiment, the second controller 228 can be implemented such that the third sequence of recovery operations is updated after each recovery from the first fault F1 to determine an optimized third sequence of recovery operations to be executed for the first fault F1. In such a scenario, the second controller 228 can be further configured to inject the first fault F1 into the first functional circuit 102. The fault injection can be executed multiple times to increase an accuracy of the estimation.

The second controller 228 can be further configured to estimate a fourth sequence of recovery operations to be executed by the second and third fault management circuits 204 and 206 for the second fault F2 in a similar manner as described above. Thus, the second controller 228 can be further configured to inject the second fault F2 into the second functional circuit 104.

The second controller 228 can be further configured to update the third and fourth sets of rules based on the recoveries from the first and second faults F1 and F2, respectively. For example, if one rule of the fourth set of rules is resulting in excessive recovery time, the second controller 228 can delete the corresponding rule from the fourth set of rules.

FIG. 2D illustrates a schematic block diagram of the fault recovery system 106 in accordance with yet another embodiment of the present disclosure. The fault recovery system 106 can include the first through third fault management circuits 202-206, the second controller 228, and the first through third monitoring circuits. The fault recovery system 106 of FIG. 2C is included on an SoC.

The difference between the fault recovery system 106 of FIG. 2D and the fault recovery system 106 of FIG. 2C is in a manner in which the failure of the first and second fault management circuits 202 and 204 is indicated to the third fault management circuit 206. Further, the difference between the fault recovery system 106 of FIG. 2C and the fault recovery system 106 of FIG. 2B is in the absence of the fourth fault management circuit 208, and in turn, the fourth monitoring circuit.

When the first fault management circuit 202 fails to recover the first functional circuit 102 from the first fault F1 (i.e., when the first time-out signal TM1 is received), the first processing circuit 214 can be further configured to generate and provide the first timestamp value TV1 to the third fault management circuit 206. The first timestamp value TV1 can be equal to the first predetermined time duration. In such a scenario, the third fault management circuit 206 (i.e., the third processing circuit 222) can be further configured to execute the third recovery operation based on the first timestamp value TV1. Similarly, when the second fault management circuit 204 fails to recover the second functional circuit 104 from the second fault F2 (i.e., when the second time-out signal TM2 is received), the second processing circuit 218 can be configured to generate and provide the second timestamp value TV2 to the third fault management circuit 206. The second timestamp value TV2 can be equal to the second predetermined time duration. In such a scenario, the third fault management circuit 206 (i.e., the third processing circuit 222) can be further configured to execute the fourth recovery operation based on the second timestamp value TV2.

In the fault recovery system 106 of FIG. 2D, for the first and second faults F1 and F2, the third processing circuit 222 can be further configured to receive the first and second timestamp values TV1 and TV2 from the first and second processing circuits 214 and 218, respectively. Further, the third processing circuit 222 can be configured to generate and provide the fifth control signal CS5 to the third timer 220 when the first and second timestamp values TV1 and TV2 are received. While the third timer 220 is activated, the third processing circuit 222 can be further configured to execute the third and fourth recovery operations for the first and second faults F1 and F2, respectively. In such a scenario, the third timer 220 can time out when the third timer count is equal to the fifth threshold value. Further, the time taken by the third timer count to update from the third predetermined value to the fifth threshold value can be equal to the third or fourth predetermined time duration.

Thus, the fault recovery system 106 of the present disclosure includes a hierarchical structure of fault management circuits to recover a functional circuit (such as the first and second functional circuits 102 and 104) from a fault (such as the first and second faults F1 and F2). In such a scenario, a fault management circuit (e.g., the third fault management circuit 206) attempts recovery of the functional circuit from the fault exclusively when a fault management circuit in a lower hierarchical level (e.g., the first or second fault management circuit 202 or 204) fails to complete the recovery. Further, a controller (such as the first and second controllers 210 and 228) of the fault recovery system 106 estimates an optimized sequence of recovery operations to be executed for each fault based on the previously executed recovery operations and reporting and status data associated therewith. The hierarchical fault recovery ensures that the fault recovery for each fault does not consume the entire FHTI associated with the fault recovery system 106. Further, the operations of the controller optimize the hierarchical fault recovery implemented by the fault recovery system 106. The operations of the controller thus further reduce a time duration required for the fault recovery in the fault recovery system 106 of the present disclosure, and in turn, increase the availability of the fault management circuits. Thus, a performance (i.e., a throughput) of the fault recovery system 106 of the present disclosure is significantly greater than that of a conventional recovery system where fault recovery for each fault consumes an entire FHTI. The fault recovery system 106 of the present disclosure thus executes the fault recovery of functional circuits in a more efficient manner as compared to that executed by the conventional fault recovery system.

A fault recovery system includes various fault management circuits that form a hierarchical structure. One fault management circuit detects a fault in a functional circuit and executes a recovery operation to recover the functional circuit from the fault. When the fault management circuit fails to recover the functional circuit from the fault within a predetermined time duration, a fault management circuit that is in a higher hierarchical level executes another recovery operation to recover the functional circuit from the fault. Such a fault management circuit is required to execute the corresponding recovery operation within another predetermined time duration to successfully recover the functional circuit from the fault. The fault recovery system thus implements the hierarchical structure of fault management circuits to recover the functional circuit from the fault.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:
1. A fault recovery system, comprising:
an electronic circuitry including at least one of a printed circuit board and a system-on-chip, the electronic circuitry comprising:
a first fault management circuit that is electrically coupled with a first functional circuit, wherein the first functional circuit comprises a processor or a memory, and configured to detect a first fault in the first functional circuit and execute a first recovery operation to recover the first functional circuit from the first fault;
a second fault management circuit that is electrically coupled with the first fault management circuit, and configured to execute, based on a failure of the first fault management circuit to execute the first recovery operation within a first predetermined time duration, a second recovery operation to recover the first functional circuit from the first fault; and a controller that is electrically coupled with the first and second fault management circuits, and configured to:

record an operational state associated with the fault recovery system and a set of rules associated with the first fault;

receive, from the first and second fault management circuits, first and second reporting data when the first and second fault management circuits execute the first and second recovery operations, respectively, wherein the first reporting data and the second reporting data are indicative of the first and second predetermined time durations, respectively; and estimate a sequence of recovery operations to be executed by the first and second fault management circuits for the first fault based on the operational state, the set of rules, the first and second predetermined time durations, and availability of the first and second fault management circuits during the first and second recovery operations, respectively.

2. The fault recovery system of claim 1, wherein the second fault management circuit executes the second recovery operation based on one of (i) a fault detection signal that is indicative of the detection of the first fault and a first trigger signal that is indicative of the failure of the first fault management circuit to execute the first recovery operation within the first predetermined time duration, and (ii) a first timestamp value that is equal to the first predetermined time duration.

3. The fault recovery system of claim 2, wherein the first fault management circuit comprises:

a first timer that is configured to generate a first timer count; and a first processing circuit that is coupled with the first timer and the first functional circuit, and configured to detect the first fault in the first functional circuit, and generate and provide a first control signal to the first timer to activate the first timer, wherein while the first timer is activated, the first processing circuit is further configured to execute the first recovery operation.

4. The fault recovery system of claim 3, wherein when the first timer count is equal to a first threshold value, the first timer is further configured to generate a first time-out signal, wherein equality of the first timer count and the first threshold value is indicative of the failure of the first fault management circuit to execute the first recovery operation within the first predetermined time duration, and wherein the first processing circuit is further configured to receive the first time-out signal from the first timer, and generate and provide a second control signal to the first timer to deactivate the first timer.

5. The fault recovery system of claim 4, wherein the first processing circuit is further coupled with the second fault management circuit, and configured to generate and provide, when the first fault is detected, the fault detection signal to the second fault management circuit, and wherein the first processing circuit is further configured to generate and provide, when the first time-out signal is received, the first trigger signal to the second fault management circuit.

6. The fault recovery system of claim 4, wherein the first processing circuit is further coupled with the second fault management circuit, and configured to generate and provide, when the first time-out signal is received, the first timestamp value to the second fault management circuit.

7. The fault recovery system of claim 2, wherein the first functional circuit is successfully recovered from the first fault when the second fault management circuit executes the second recovery operation within a second predetermined time duration, and wherein the recovery of the first functional circuit from the first fault is unsuccessful when the execution of the second recovery operation exceeds the second predetermined time duration.

8. The fault recovery system of claim 7, wherein the second fault management circuit comprises:

a second timer that is configured to generate a second timer count; and a second processing circuit that is coupled with the second timer, and configured to generate and provide a third control signal to the second timer to activate the second timer, and execute the second recovery operation, wherein when the second processing circuit executes the second recovery operation within the second predetermined time duration, the second processing circuit is further configured to generate and provide a fourth control signal to the second timer to deactivate the second timer.

9. The fault recovery system of claim 7, wherein when the execution of the second recovery operation exceeds the second predetermined time duration, the second fault management circuit is further configured to generate one of (i) a second trigger signal that is indicative of the failure of the second fault management circuit to execute the second recovery operation within the second predetermined time duration, and (ii) a second timestamp value that is equal to a sum of the first and second predetermined time durations.

10. The fault recovery system of claim 9, wherein the second fault management circuit comprises:

a second timer that is configured to generate a second timer count; and a second processing circuit that is coupled with the second timer and the first fault management circuit, and configured to receive, from the first fault management circuit, one of (i) the fault detection signal and the first trigger signal, and (ii) the first timestamp value.

11. The fault recovery system of claim 10, wherein when the fault detection signal is received, the second processing circuit is further configured to generate and provide a third control signal to the second timer to activate the second timer, and when the first trigger signal is received, the second processing circuit is further configured to execute the second recovery operation.

12. The fault recovery system of claim 11, wherein when the second timer count is equal to a second threshold value, the second timer is further configured to generate a second time-out signal, wherein equality of the second timer count and the second threshold value is indicative of the failure of the second fault management circuit to execute the second recovery operation within the second predetermined time duration, wherein the second processing circuit is further configured to receive the second time-out signal from the second timer, and generate and provide a fourth control signal to the second timer to deactivate the second timer, and wherein the second processing circuit is further configured to generate the second trigger signal when the second time-out signal is received.

13. The fault recovery system of claim 10, wherein the second processing circuit is further configured to generate and provide a third control signal to the second timer to activate the second timer when the first timestamp value is received, and wherein while the second timer is activated, the second processing circuit is further configured to execute the second recovery operation.

14. The fault recovery system of claim 13, wherein when the second timer count is equal to a second threshold value, the second timer is further configured to generate a second time-out signal, wherein equality of the second timer count and the second threshold value is indicative of the failure of the second fault management circuit to execute the second recovery operation within the second predetermined time duration, wherein the second processing circuit is further configured to receive the second time-out signal from the second timer, and generate and provide a fourth control signal to the second timer to deactivate the second timer, and wherein the second processing circuit is further configured to generate the second timestamp value when the second time-out signal is received.

15. The fault recovery system of claim 9, further comprising a third fault management circuit that is coupled with the first and second fault management circuits, and configured to execute a third recovery operation to recover the first functional circuit from the first fault based on one of (i) the fault detection signal and the second trigger signal, and (ii) the second timestamp value, wherein the first functional circuit is successfully recovered from the first fault when the third fault management circuit executes the third recovery operation within a third predetermined time duration.

16. The fault recovery system of claim 15, further comprising a controller that is coupled with the first through third fault management circuits, and configured to:
 record an operational state associated with the fault recovery system and a set of rules associated with the first fault;
 receive, from the first through third fault management circuits, first through third reporting data when the first through third fault management circuits execute the first through third recovery operations, respectively, wherein the first through third reporting data are indicative of the first through third predetermined time durations, respectively; and
 estimate a sequence of recovery operations to be executed by the first through third fault management circuits for the first fault based on the operational state, the set of rules, the first through third predetermined time durations, and availability of the first through third fault management circuits during the first through third recovery operations, respectively.

17. The fault recovery system of claim 16, wherein the controller is further configured to update the set of rules based on the estimated sequence of recovery operations.

18. The fault recovery system of claim 1, further comprising a fourth fault management circuit that is coupled with a second functional circuit and the second fault management circuit, and configured to detect a second fault in the second functional circuit, and execute a fourth recovery operation to recover the second functional circuit from the second fault,
 wherein the second fault management circuit is further configured to execute a fifth recovery operation to recover the second functional circuit from the second fault based on a failure of the fourth fault management circuit to recover the second functional circuit from the second fault within a fourth predetermined time duration, and
 wherein the first and second functional circuits are successfully recovered from the first and second faults when the second fault management circuit executes the second and fifth recovery operations, respectively, within a fifth predetermined time duration, and the recoveries of the first and second functional circuits from the first and second faults, respectively, are unsuccessful when the execution of the second and fifth recovery operations exceeds the fifth predetermined time duration.

19. Electronic circuitry, comprising:
a first functional circuit, wherein the first functional circuit comprises a processor or a memory; and
a fault recovery system that is coupled with the first functional circuit, wherein the fault recovery system comprises:
an electronic circuitry including at least one of a printed circuit board and a system-on-chip, the electronic circuitry comprising:
 a first fault management circuit that is coupled with the first functional circuit, and configured to detect a first fault in the first functional circuit and execute a first recovery operation to recover the first functional circuit from the first fault; and
 a second fault management circuit that is coupled with the first fault management circuit, and configured to execute, based on a failure of the first fault management circuit to execute the first recovery operation within a first predetermined time duration, a second recovery operation to recover the first functional circuit from the first fault; and
 a controller that is electrically coupled with the first and second fault management circuits, and configured to:
  record an operational state associated with the fault recovery system and a set of rules associated with the first fault;
  receive, from the first and second fault management circuits, first and second reporting data when the first and second fault management circuits execute the first and second recovery operations, respectively, wherein the first reporting data and the second reporting data are indicative of the first and second predetermined time durations, respectively; and
  estimate a sequence of recovery operations to be executed by the first and second fault management circuits for the first fault based on the operational state, the set of rules, the first and second predetermined time durations, and availability of the first and second fault management circuits during the first and second recovery operations, respectively.

\* \* \* \* \*